Figure 1:
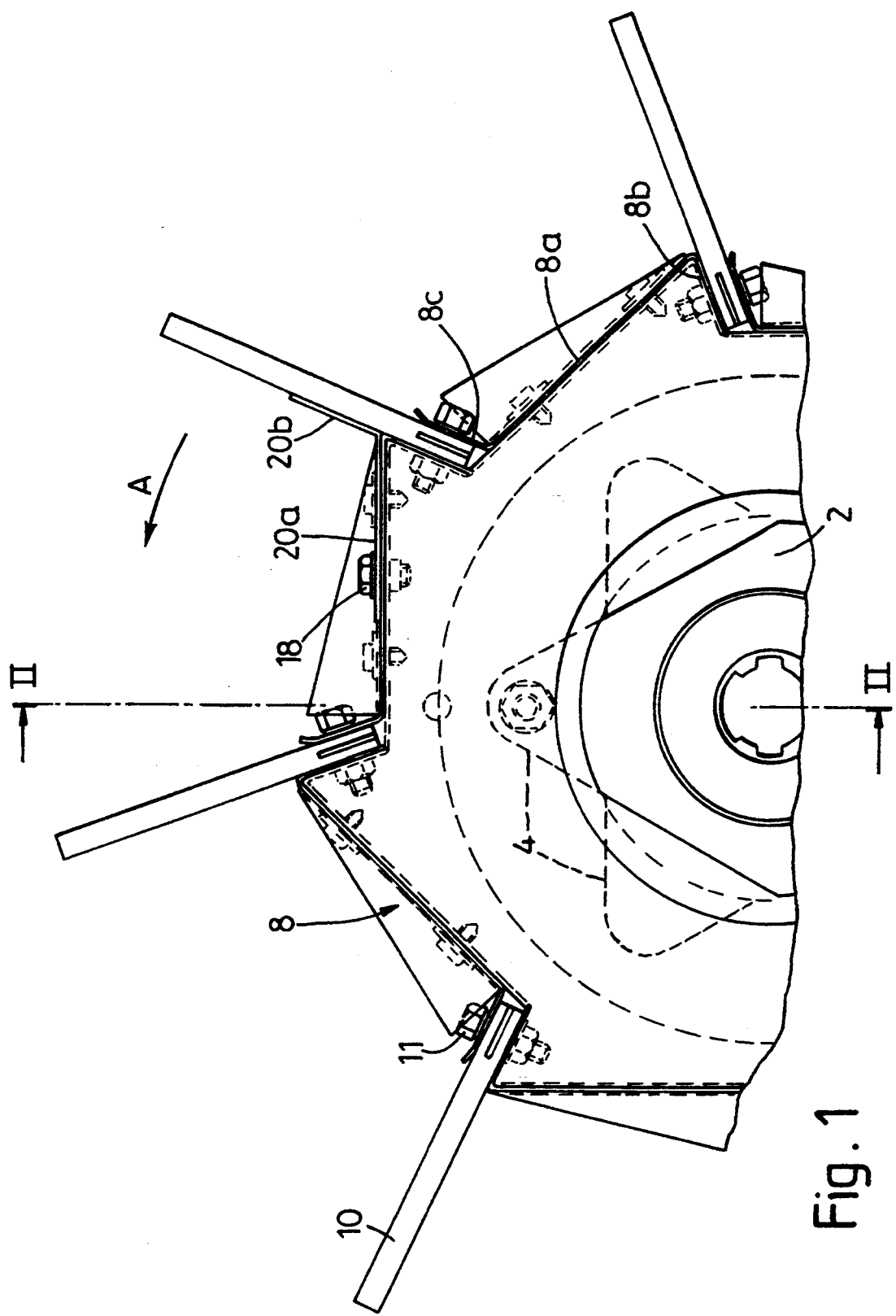

United States Patent

Shelbourne et al.

Patent Number: 5,389,038
Date of Patent: Feb. 14, 1995

[54] CROP STRIPPERS

[75] Inventors: Keith H. Shelbourne, Pakenham; Paul J. McCredie, Ipswich, both of England

[73] Assignee: Shelbourne Reynolds Engineering Ltd., Suffolk, England

[21] Appl. No.: 50,435

[22] PCT Filed: Nov. 12, 1991

[86] PCT No.: PCT/GB91/01985
§ 371 Date: Jun. 10, 1993
§ 102(e) Date: Jun. 10, 1993

[87] PCT Pub. No.: WO92/08339
PCT Pub. Date: May 29, 1992

[30] Foreign Application Priority Data

Nov. 12, 1990 [GB] United Kingdom ............... 9024565

[51] Int. Cl.6 ............................................. A01D 45/00
[52] U.S. Cl. .................................. 460/122; 56/128
[58] Field of Search ................... 56/126, 128, 14.6; 460/113, 121, 122

[56] References Cited

U.S. PATENT DOCUMENTS 5,036,653  8/1991  Klinner ................ 460/121 X
5,044,147  9/1991  Klinner ................. 56/128 X Primary Examiner—George A. Suchfield
Attorney, Agent, or Firm—Dennis T. Griggs

[57] ABSTRACT

A crop stripper drum has a series of axial rows of flexibly displaceable teeth (12) circumferentially spaced around the drum. At the roots of the teeth are bulbous openings (12b, 22a) formed in metal members, which may comprise the teeth (12) or be elements (21) separate therefrom. For flexibility, the teeth may be given root openings larger than the openings formed by said separate elements, thereby reducing their root widths, or they may be put in a resilient mounting (62) that increases the deflection they experience under load. Separate elements (52) provided for forming the stripper openings, may be of an adjustable form to vary the width of the openings. The constructions disclosed are able to allow the use of metal for the active stripping means, whereby to increase the service life and reduce the power requirements. Adjustment of the size of the openings allows the striper to be adapted to harvest different crops.

11 Claims, 4 Drawing Sheets

CROP STRIPPERS

This invention relates to crop strippers for detaching and harvesting crops from standing plants. Such strippers are best known for stripping grain from the heads of cereal crops such as wheat and herbage crops such as grass seed, but they can also be used to harvest crops such as rice, safflower, milo and peas, or to strip leaves, young shoots or blossom, for example, from the stems of crops.

WO86/01972 describes a crop stripper comprising a rotary drum which has its axis of rotation extending generally horizontally and transversely to the direction of advance through a crop. The drum is provided at its periphery with a number of axial rows or combs of projecting teeth at equispaced intervals about its periphery. As the machine advances through a standing grain crop, the drum is rotated with its lower periphery turning in the direction of advance. The stems of the crop are trapped in the spaces between the projecting teeth and as they are drawn around the drum the grain is stripped from the heads of the plants.

The teeth are required to deflect easily, both to avoid damage from contact with obstacles or the ground, and to allow them to yield to the resistance of the plant stems through which they are drawn. On that account, it is customary to make the teeth of plastics. It is found, however, that they wear very rapidly when handling some crops and require frequent replacement because their stripping efficiency is then affected.

According to one aspect of the present invention, a stripper drum for a crop stripper has a plurality of axially extending rows of teeth, the rows being mounted at spaced intervals about the periphery of the drum with the teeth projecting outwards, and registering with said teeth there is a series of projecting elements of smaller radial extent, said elements forming openings that register with the gaps between the teeth at their roots.

With the teeth formed from a flexible plastics material, such as polyethylene, and the projecting elements from an abrasion resistant material such as metal, it is found that by shaping said openings to substantially conform with the gaps between the teeth or to overlap the edges of said gaps, it is possible to protect the plastics teeth against premature wear without in any way affecting their flexibility and operating efficiency. The projecting elements can themselves be of relatively thin sheet metal because they can be protected against excessive bending loads by the flexible teeth.

Furthermore, although it has been found necessary in the past to form the teeth of crop strippers' drums from plastics material in order to give them adequate flexibility it now is found that metal teeth can be made sufficiently flexible, especially if the shape of the stripping openings at their roots can be formed by the associated smaller radial elements, independently of the teeth themselves. The possibility of making the teeth of metal brings the additional advantage that friction from the crop is reduced and therefore the power requirement is reduced.

In some crops rigid teeth can be used because there is little or no risk of the teeth being overstressed: nevertheless there can be advantages in such circumstances in providing the projecting elements as aforesaid, in register with the teeth. Where flexibility of the teeth is significant it may be required to keep the width of the teeth small and it is desirable that the metal itself should be capable of large elastic deformations, e.g. being a spring steel. The limitation of the width of a tooth is most effective in increasing flexibility if it is done at the tooth root, but that can increase the gap between the teeth to an undesirable extent from the point of view of stripping efficiency. However, the smaller elements can be formed with openings significantly smaller than the gaps at the tooth roots and so provide the operative stripping surfaces in that region.

For grain stripping in particular, the flexible teeth preferably taper towards their outer radial extremities so that the gap between them widens towards their tips. But it is also preferred to form an increased width gap at their roots, preferably with a bulbous gap profile. A combination of these features gives the gap between a pair of teeth a keyhole-like shape.

The projecting elements preferably extend radially over the height of said bulbous profile with the openings between them having a corresponding profile over that height. It is an advantage if these overlying elements continue radially outwards a short distance beyond the bulbous profile and have a greater taper in this outer region than the taper of the corresponding portions of the flexible teeth, so that at the tips of the projecting elements the profile of each flexible tooth extends laterally beyond the profile of its overlying projecting element.

According to another aspect of the invention, a stripper drum provided with a series of teeth and with supplementary smaller radial elements associated with the teeth is so constructed that there are separate attachment means for said teeth and said elements. Such an arrangement makes it easier to replace the teeth and/or the elements when required due to wear or damage. The teeth can be grouped as a series on one or more plates, whether metal or plastics, extending the axial length of the drum and the smaller radial elements can be similarly grouped.

To give the teeth a required degree of yielding under load, in particular if the teeth are made of metal, they can be secured on the drum through flexible mounting means, for example pads of a relatively soft plastics material. Such mounting means can be arranged not only to allow greater displacement of the teeth but can also reduce stress concentrations from bending loads applied to the teeth.

Since the formation of the teeth from metal can provide the improved wear characteristics referred to above, the flexibility given by the flexible mounting means can make it possible to dispense with the series of projecting elements referred to above. According to a further aspect of the invention, therefore, there is provided a stripper drum comprising a plurality of axially extending rows of teeth at spaced intervals about the periphery of the drum with the teeth projecting outwards, flexible mounting means securing the rows of teeth through radially inner portions thereof, said mounting means being deformable by bending loads acting on the teeth against the direction of rotation of the stripper drum to permit deflection of said inner portions under said loads.

Figure 2:
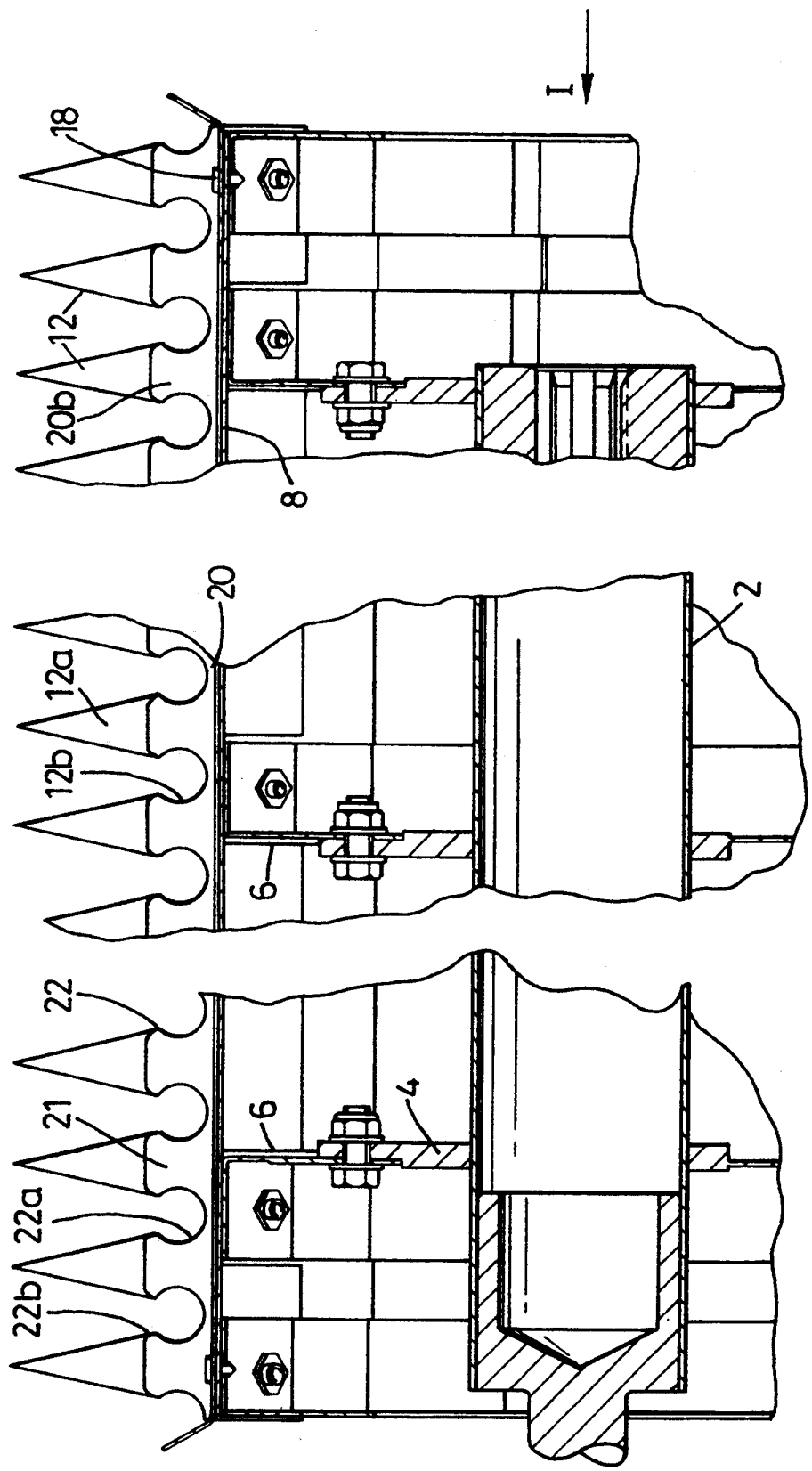
Figure 3:
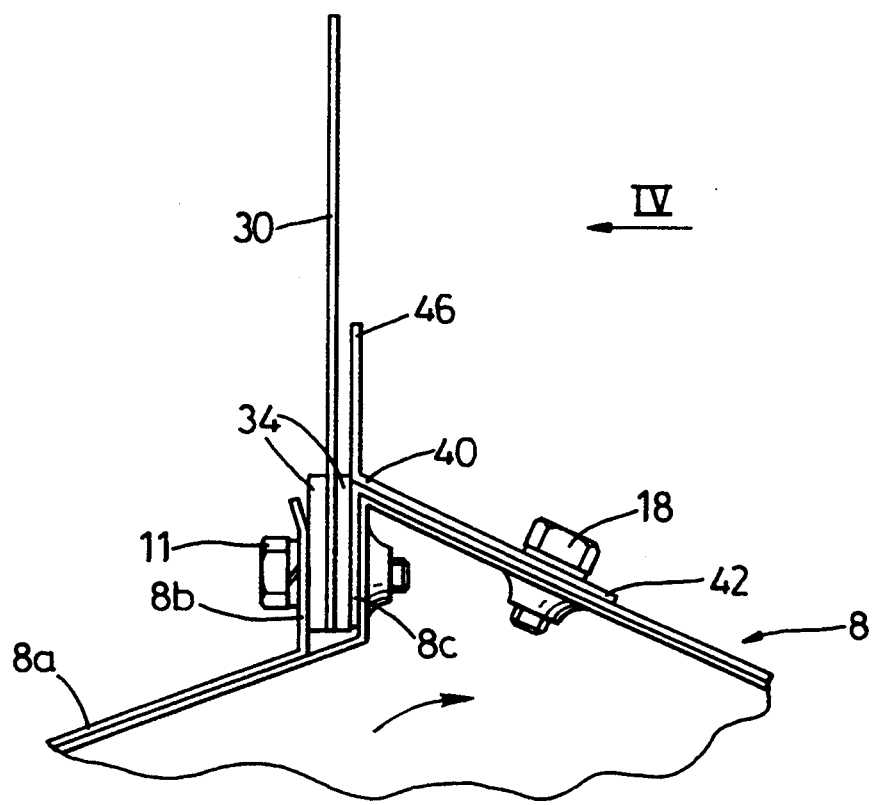
Figure 4:
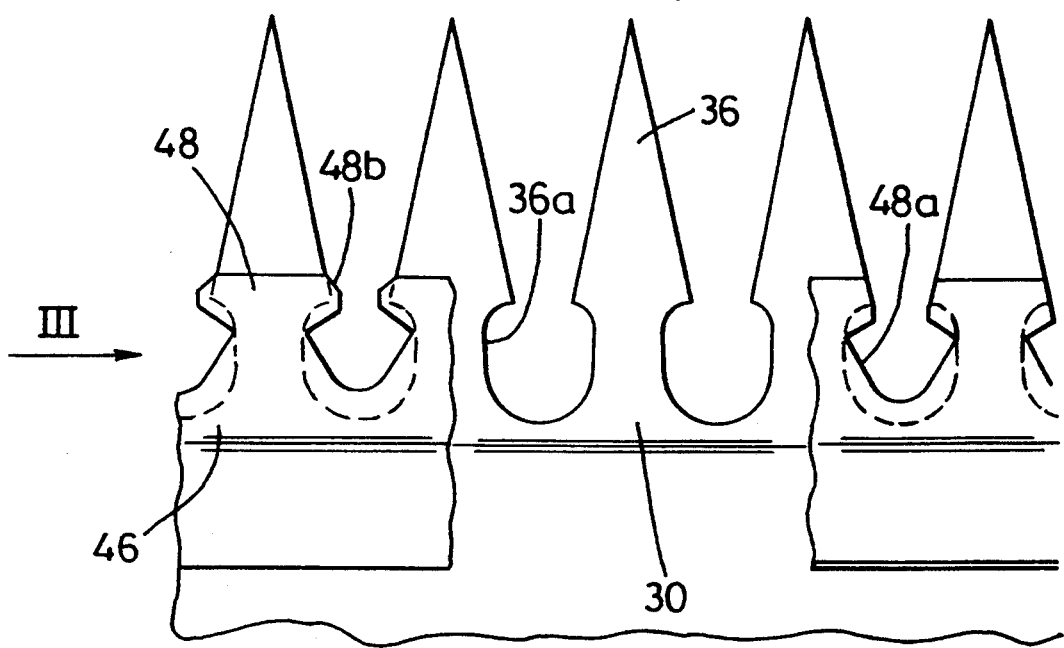
Figure 5:
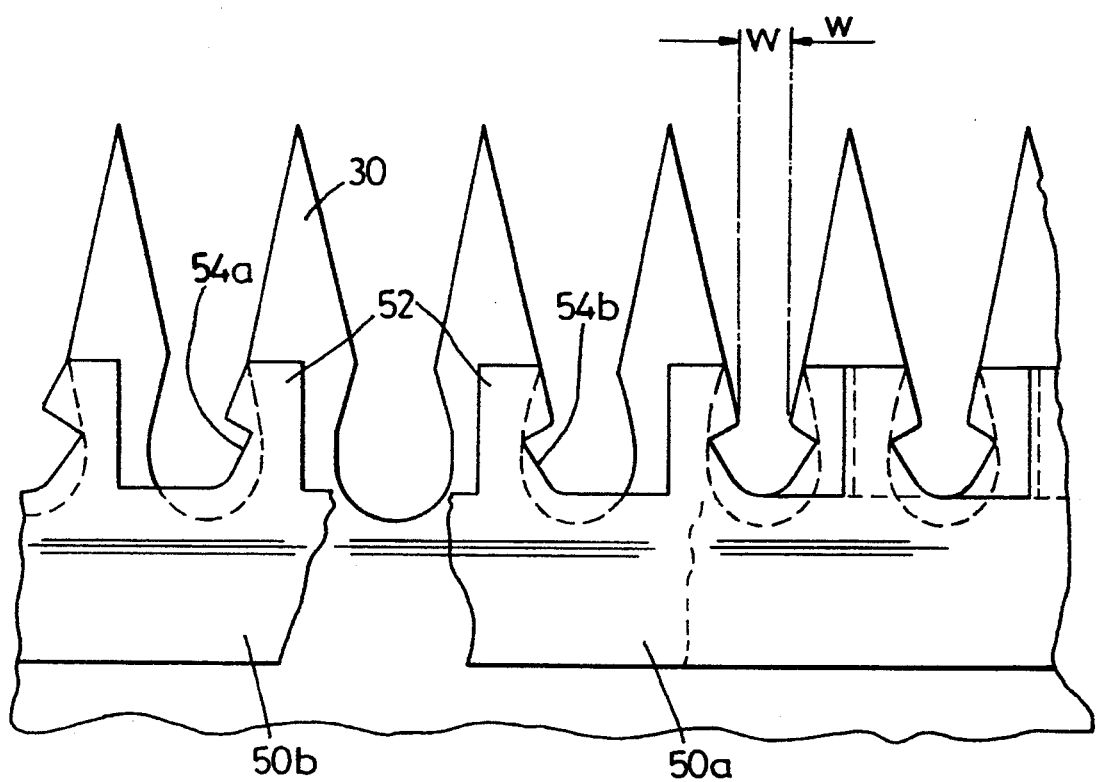
Figure 6:
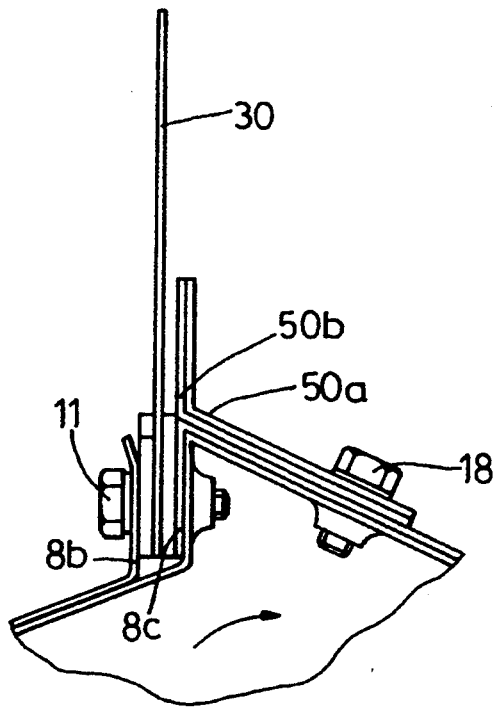
Figure 7:
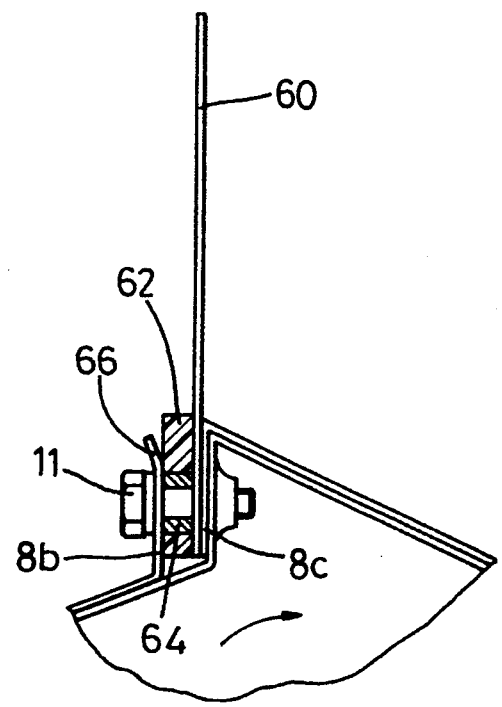

The invention will be described in more detail by way of example with reference to the accompanying drawings, in which:

FIG. 1 is a broken-away end view of a stripper drum, in the direction of arrow I in FIG. 2, with one of its sectors provided with leading shorter teeth in accordance with the invention, FIG. 2 is a broken-away axial section on the plane II—II in FIG. 1 showing the registering sets of teeth in that sector, FIG. 3 is a fragmentary end view of another stripper drum according to the invention in the direction of arrow I in FIG. 4, FIG. 4 is a fragmentary front view of the drum in the direction of arrow IV in FIG. 3, and FIGS. 5 and 6 are views similar to those of FIGS. 3 and illustrating a further embodiment of the invention, and FIG. 7 is a view similar to FIG. 3 illustrating another embodiment of the invention.

Referring to FIGS. 1 and 2, the drum has a central shaft or arbour 2 through which it is supported on a harvesting machine, e.g. a combine harvester (not shown), and to which a rotary drive (not shown) is connected. A series of triangular boss plates 4 are welded at intervals to the shaft and have brackets 6 bolted to them. Bolted in turn to the brackets are axially extending cover plates 8 forming the peripheral surface of the drum body. The cover plates are each a Z-section member comprising a main, generally tangential web 8a from which project a pair of shorter wings 8b,8c, the wing 8b at the leading edge of the web 8a being directed generally radially outwards and the remaining wing 8c generally radially inwards.

The wings 8b,8c of adjacent cover plates lie opposed and parallel to each other at a small spacing apart. In each of the spaces between these wings a comb plate 10 is inserted and is secured between the cover plates by self-tapping screws 11. The comb plate, which is made of polyethylene, is formed with a series of outwardly directed teeth 12, the outer main portions 12a of which taper substantially to a point. Nearer the roots of the teeth the direction of taper is reversed and a bulbous opening 12b is formed between each adjacent pair of teeth at their roots. Such comb plates are well known and the gap profile has been developed to promote efficient grain stripping from many crops, but hitherto the wear of the profile could be so severe that the efficiency of operation cannot be maintained without frequent changes of the comb plates.

In the present example, also secured to each cover plate 8, by self-tapping screws 18, is a protector plate 20 (only one being shown in FIG. 1) comprising a base portion 20a that lies against the cover plate and through which the screws pass, and a toothed profiled portion 20b having a series of radial projections or short teeth 21 that, in a position of rest of the drum, lie against the front face of the adjacent comb plate 10. For its greater part the toothed profile 22 of the protector plate portion 20b corresponds to the root profile 12b of the plastics comb plate teeth it overlies. The tips of the projections extend a short distance beyond the bulbous root profile 22a and there they have a profile different from that of the comb plate teeth. Their tips 22b are in fact, more sharply tapered than the comb plate teeth.

In use, the drum is carried on a harvesting machine to travel from left to right as seen in FIG. 1 while rotating in the direction indicated by the arrow A. As the drum rotates each comb plate 10 descends into the grain crop being harvested. In the movement of the comb plate through the crop, the stems of the plants are trapped between the teeth and are drawn into the bulbous openings 12b,22a at the roots of the teeth. There the main stripping action takes place, and the grain is freed from the plants to be carried off by conveying means (not shown) and collected in the machine in known manner.

During the operation of the machine, the plastics comb plate teeth can readily flex if an obstacle is met or if the machine is travelling over uneven ground, and some flexure will also be induced by the resistance of the plant stems. As the stems slide along the tapered main portions 12a of the teeth they reach the bulbous openings 12b at the Foots and bearing contact is transferred to the profiled portion 20b of the protector plate. Friction from the stems as the drum is driven through the crop now acts on the metal of that plate rather than the plastics of the comb plate. The bulbous profile of the openings at the roots of the comb plate teeth can be maintained for long periods of use because of the greater resistance of the metal to rubbing wear. The flexibility of the comb plate teeth is completely unaffected but at the same time they are able to help the metal teeth resist pressure loads and the protector plate can be made of relatively thin sheet metal. The metal projections are also protected against impact from obstacles by the preceding comb plate, the teeth of which act as an effective shield even when they are deflected by an obstacle towards the protector plate so that there is little danger of damage to the root gap profile from this source, The increased taper at the tips of the metal projections reduces the exposure of the projections to any obstacles that pass between the plastics teeth, while at the same time they prevent the snagging of plant stems that are sliding along the edges of the comb plate teeth behind them, even if those teeth are flexed away from the projections by the friction loads from the crop.

The tapered sides of the plastics teeth are less effected by wear than the unprotected root openings would be, possibly because the stems can slide along the edges of the teeth. Indeed, close study indicates that the rapid wear previously suffered by the plastics comb plates at the roots of the teeth was more in the nature of ablation than abrasion. The use of metal for the protector plates, with its higher thermal conductivity, renders such an effect less likely.

In the embodiment shown in FIGS. 3 and 4, parts already described with reference to FIGS. 1 and 2 are indicated by the same reference numbers. In the space between each pair of wings 8b,8c the screws 11 now clamp a sheet metal comb plate 30. Spacers 34 are also clamped by the screws because the spacing between the wings is sufficiently large to accommodate the thickness of a conventional plastics comb plate instead of the metal plate illustrated. If that is not required, the wings 8b,8c can be set closer together and the spacers 34 omitted. The comb plate 30 comprises a series of outwardly directed teeth 36, the outer main portions of which taper substantially to a point at their tips. Nearer the roots of the teeth the width of each tooth is reduced considerably by a bulbous opening 36a between adjacent pairs of teeth.

Mounted on each cover plate 8 is a supplementary metal protector plate 40 having an angle-section comprising a base portion 42 secured against the cover plate by the screws 18 and a toothed profile portion 46 parallel to the toothed comb plate 10 and having a series of radial projections or short teeth 48 that are in register with the teeth 36 of the comb plate. The projections 48 of the supplementary plate are relatively stiff compared with the comb plate teeth 36. As is clear from FIG. 2, the size of the root openings 48a between the projections is considerably less than the openings 36a between the comb teeth and the material of the supplementary plate is more rigid.

The comb plates 30 and supplementary plates 40 are separately secured to the stripper drum by the screws 11 or 18 respectively. These plates can be removed and replaced independently of each other, so that maintenance of the stripping drum is simplified.

During the operation of the machine the comb plate teeth 36 are intended to flex readily over obstacles or due to the resistance of plant stems through which they are moving. The tapered main portions of the teeth guide the stems into the root openings 48a between the projections of the protector plate. The two sets of root openings 36a,48a may be differently shaped from each other because they are designed for different functions. The openings of the protector plate, being smaller than the root openings of the comb plate, exert a stripping action on the plant stems and they can be shaped so as to optimise this function. In contrast, the larger openings 36a at the roots of the comb plate teeth do not influence on the stripping action and the openings can be formed primarily to give a desired degree of flexibility to the teeth. At their radially outer ends, the projections 48 have tapered side faces 48b which can provide a relatively smooth transition for plant stems sliding over the tapered sides of the teeth 36 into the openings 48a.

In the example of FIGS. 5 and 6, the protector plate 40 is replaced by a pair of overlapping plate members 50a,50b that cooperate to form the stripping openings. Each plate member has a series of spaced projections 52, a profiled form being given to one side edge 54a or 54b of each projection, and the profiled edges 54a of one member being opposed to the profiled edges 54a of the other member. The screws 18 securing the members 50a,50b pass through elongated slots (not shown) in the members so that they can be adjusted laterally of each other to place the opposed profile edges 54a,54b of each opening closer together or further apart. It is thereby possible to vary the width w of the stripping openings by adjusting the positions of the members 50a,50b. It is known that the optimum dimensions of crop stripper teeth depend on the particular crop being harvested and the arrangement of FIG. 5 and 6 provides a ready way of adapting a stripper drum to harvest different crops without requiring additional resources. The arrangement is particularly useful because of the ease with which the protector plates can be released.

As in the example of FIGS. 3 and 4 the profile at the roots of the teeth 30 is not critical as long as it does not limit the range of adjustment of the members 50a,50b. Also, although reference has been made to the embodiment of FIGS. 3 and 4 it will be understood that the teeth 30 of this modified construction can be of a plastics material.

In FIG. 7 a further embodiment of the invention is shown which is similar in all unillustrated aspects to the embodiments already described. In this case, a metal comb plate 60 is provided and has teeth with the same profile as the plastic comb plate 10 of the first example: that is to say the teeth have tapered outer portions to gather the crop and bulbous root openings to perform the main stripping function. As has been mentioned above, such a metal comb plate does nor have sufficient flexibility to operate satisfactorily but in the present example the comb plate 60 is sandwiched in the spacing between the wings 8b,8c with a thicker pad 62 of resilient material, e.g. of plastics, such as polyurethane, or rubber. The screws 11 pass through rigid spacer tubes 64 in the pad 62 to limit pre-compression of the pad. Preferably the pad 62 has a Shore A hardness substantially in the range of 40 to 95, preferably 50 to 60. The spacing between the wings 8b,8c can be increased to accommodate a greater thickness of resilient material, which the degree of cant applied to angled edge 66 of the wing 8c will also influence the overall flexibility. The comb plate 10 is shown butted against the front wing 8c to place the maximum thickness of resilient material behind the plate but it is also possible to insert some resilient material between the wing 8c and the plate 60.

In all the examples described herein the comb plates can be manufactured in modular lengths so that they can be used to build up drums of different axial lengths. The protector plates can be simply produced in modular lengths.

We claim:

1. A crop stripper having a stripper drum provided with a series of outwardly projecting crop-stripping teeth, said teeth being arranged in a plurality of axially extending rows mounted at spaced intervals about the periphery of the drum, a series of projecting elements of smaller radial extent and leading said teeth arranged in a corresponding plurality of axially extending rows, the teeth of each row of teeth and the elements of each row of projecting elements having corresponding pitches and being in alignment with each other, whereby each crop-stripping tooth has an inner portion behind a said element aligned therewith and an outer portion projecting outwardly of said element, and said elements form openings that align with the gaps between the teeth at their roots.

2. A crop stripper according to claim 1 wherein the gaps between the teeth are at least substantially as large as the openings between the elements.

3. A crop stripper according to claim 1, wherein said openings have a bulbous form with a maximum width greater than a radially outer entry neck of the opening.

4. A crop stripper according to claim 1 wherein the elements have radially outer end margins which are overlapped laterally by the radially coincident portions of the teeth.

5. A crop stripper according to claim 1 wherein said projecting elements are provided on an angled plate having a first limb by which the plate is detachably secured to the drum and a second limb on which said elements are formed.

6. A crop stripper according to claim 1 wherein the teeth and the projecting elements have separate attachment elements to secure them to the drum.

7. A crop stripper according to claim 1 wherein the teeth are held against resilient support means which are deformable by tangential loads on the teeth in use.

8. A crop stripper according to claim 1 wherein the teeth are arranged to be flexibly deformable away from the projecting elements in use.

9. A stripper drum for a crop stripper provided with stripper means according to claim 1.

10. A crop stripper having a stripper drum provided with a series of outwardly projecting crop-stripping teeth, said teeth being arranged in a plurality of axially extending rows mounted at spaced intervals about the periphery of the drum, a series of projecting elements of smaller radial extent and leading said teeth arranged in a corresponding plurality of axially extending rows, the teeth of each row of teeth and the elements of each row of projecting elements having corresponding pitches and being in alignment with each other, each crop-stripping tooth having an inner portion behind a said element aligned therewith and an outer portion projecting outwardly of said element, and said elements forming openings that align with the gaps between the teeth at their roots, wherein the projecting elements overlap the edges of the teeth at their roots.

11. A crop stripper having a stripper drum provided with a series of outwardly projecting crop-stripping teeth, said teeth being arranged in a plurality of axially extending rows mounted at spaced intervals about the periphery of the drum, a series of projecting elements of smaller radial extent and leading said teeth arranged in a corresponding plurality of axially extending rows, the teeth of each row of teeth and the elements of each row of projecting elements having corresponding pitches and being in alignment with each other, whereby each crop-stripping tooth has an inner portion behind a said element aligned therewith and an outer portion projecting outwardly of said element, said elements forming openings that align with the gaps between the teeth at their roots, the openings of said projecting elements being formed by respective groups of elements providing opposite side edges of the individual openings, and said groups are relatively displaceable to vary the widths of the openings they form.

* * * * *